United States Patent
Joss et al.

(10) Patent No.: US 6,684,073 B1
(45) Date of Patent: Jan. 27, 2004

(54) SIGNALLING METHOD AND CONVERSION DEVICE FOR TELECOMMUNICATIONS NETWORKS

(75) Inventors: Marcel Joss, Zofingen (CH); Werner Hirzel, Niederscherli (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/386,299

(22) Filed: Aug. 31, 1999

(51) Int. Cl.$^7$ ................................................. H04Q 7/20
(52) U.S. Cl. ........................ 455/433; 455/432; 455/435; 455/436; 455/426; 455/461; 455/552; 455/560
(58) Field of Search ................................. 455/432, 433, 455/435, 436, 426, 461, 552, 560

(56) References Cited

U.S. PATENT DOCUMENTS

| | | | |
|---|---|---|---|
| 5,852,660 A | * 12/1998 | Lindquist et al. | 370/401 |
| 5,867,788 A | * 2/1999 | Joensuu | 379/219 |
| 5,878,343 A | * 3/1999 | Robert et al. | 455/424 |
| 5,933,784 A | * 8/1999 | Gallagher et al. | 370/401 |
| 6,002,931 A | * 12/1999 | Yamaguchi et al. | 379/201.01 |
| 6,094,578 A | * 7/2000 | Purcell et al. | 455/426 |
| 6,097,950 A | * 8/2000 | Bertacchi | 455/432 |
| 6,256,497 B1 | * 7/2001 | Chambers | 455/432 |
| 6,259,929 B1 | * 7/2001 | Kuisma | 455/550 |
| 2001/0016495 A1 | * 8/2001 | Chandnani et al. | 455/445 |

FOREIGN PATENT DOCUMENTS

| | | |
|---|---|---|
| GB | 2 280 085 | 1/1995 |
| SE | WO 92/19078 | * 10/1992 |

* cited by examiner

Primary Examiner—Lee Nguyen
Assistant Examiner—Sujatha Sharma
(74) Attorney, Agent, or Firm—Pillsbury Winthrop LLP

(57) ABSTRACT

A signalling method and conversion device for telecommunications networks, for example mobile networks such as GSM or UMTS networks, wherein at least certain subscribers can register in their home network, or in a telecommunications network having a roaming agreement with the operator of their home network, using a first subscriber identification from the number area of their home operator, certain of these subscribers being assigned a second subscriber identification from the number area of a partner network operator with which these subscribers can register in a visited network with which operator their home network operator does not have a roaming agreement, the signalling traffic concerning subscribers who have been registered in such a visited network with a second subscriber identification number being conducted to the partner network, being filtered there, and being rerouted to their home network, and signalling traffic concerning such subscribers received in said partner network from said home network being rerouted to this said visited network.

18 Claims, 2 Drawing Sheets

SIGNALLING METHOD AND CONVERSION DEVICE FOR TELECOMMUNICATIONS NETWORKS

Figure 1:
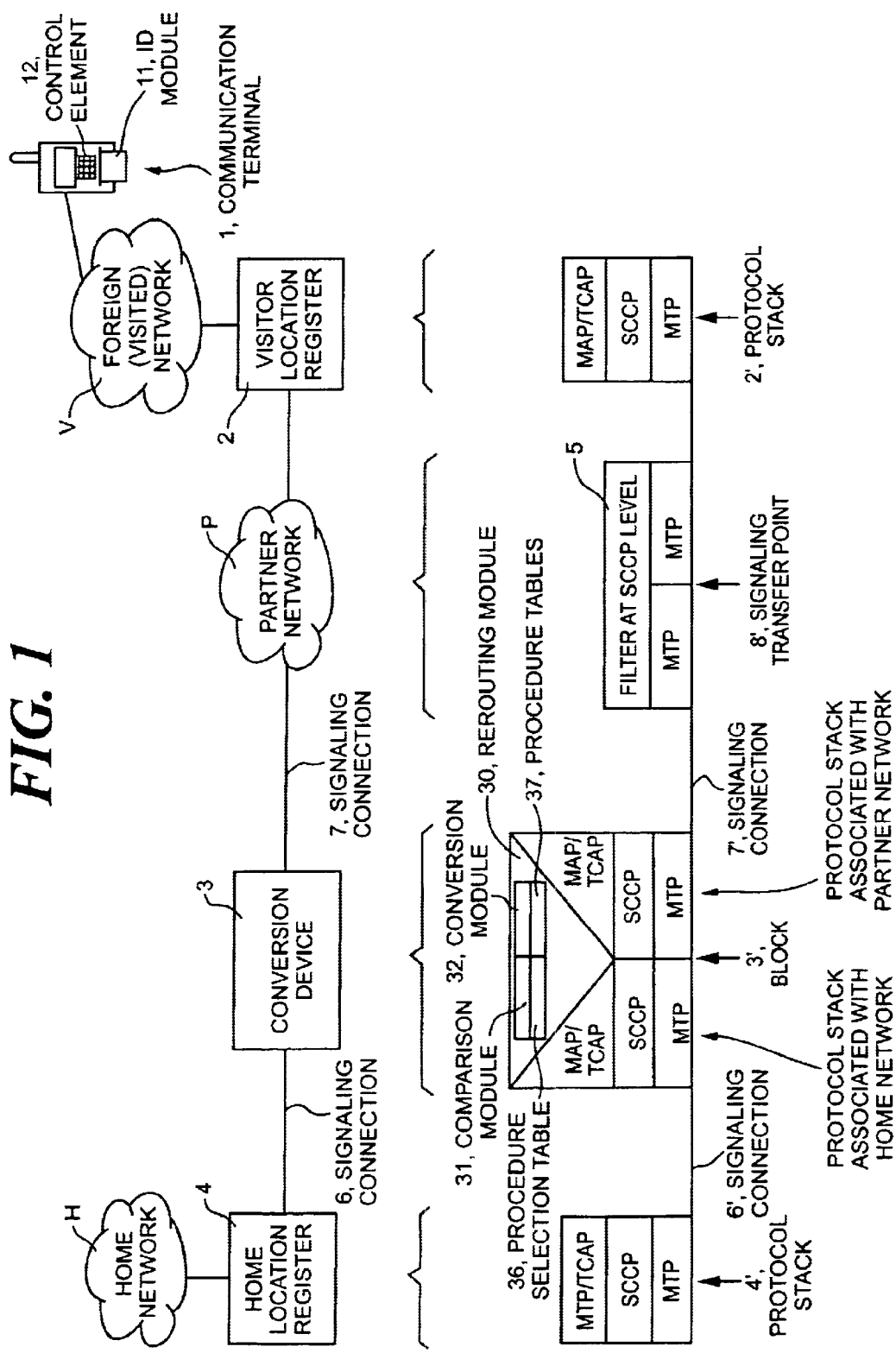

This invention relates to a signalling method and a conversion device for telecommunications networks. In particular, this invention relates to a signalling method and a conversion device for telecommunications networks in which a multiplicity of subscribers communicate using communications terminals, at least certain of these subscribers being able to register in their home network (H) or in a telecommunications network whose operator has a roaming agreement with the operator of their home network using a first subscriber identification which was assigned to them from the number area of the operator of their home network.

Telecommunications systems are known in which subscribers, using their mobile communications terminals, are able to shift (by means of a so-called roaming) into telecommunications networks which are operated, for example, by foreign network operators. The practical achievement of roaming between telecommunications networks, in particular mobile networks, typically requires reciprocal agreements between the network operators concerned; however, the networks involved first must also have correspondingly suitable mechanisms and devices to enable roaming technically. In particular the Global System for Mobile Communications (GSM) defined by the European Telecommunications Standards Institute (ETSI, F-06921 Sophia Antipolis, Cedex, France) makes it possible for subscribers with mobile communications terminals to shift from the home mobile network (Home Public Land Mobile Network, HPLMN) into visited networks (Visited Public Land Mobile Network, VPLMN). In a GSM mobile network subscriber identifications linked with call numbers and subscriber data are filed in a Home Location Register (HLR) of the HPLMN. The subscriber data comprise, inter alia, information on whereabouts for a respective subscriber, which, for example, is forwarded by a visitor location register (VLR) of a VPLMN to the said HLR. The VLR recognizes the HLR of a visiting subscriber on the basis of his subscriber identification stored in an identification module removably connected to the mobile communications terminal of the subscriber, and forwarded to the VLR by the mobile communications terminal. Either upon request or automatically, the VLR transmits to the HLR a so-called roaming number which is used by the HLR for forwarding calls to the respective mobile communications terminal in the VPLMN. A so-called Mobile Switching Center (MSC) of the GSM network has access to the information filed in the HLR, and serves, inter alia, as the interface between the mobile network and the Public Switched Telephone Network (PSTN), and transmits calls from calling communications terminals to said mobile communications terminals, respectively from said mobile communications terminals to called communications terminals. Although the defined network architecture and the services related thereto support the so-called roaming of mobile communications terminals in VPLMN, this is then only possible, however, generally speaking, if a subscriber is located in the area of a VPLMN with which the operator of his HPLMN has reached a roaming agreement.

Described in the patent GB 2 280 085 A is a method which makes it possible for a subscriber to a first mobile network, e.g. an AMPS/D-AMPS network, to roam in second networks, e.g. GSM networks, a main network of these second mobile networks having a cooperation agreement with the first mobile network and a respective subscriber being handed an identification module which contains an IMSI identifying the subscriber as a visitor to the main network and as a subscriber to the first mobile network. Upon registering in the main network, the respective subscriber is recognized as a visiting subscriber from the first mobile network, and via a communications link and a converter the main network reads subscriber data from the HLR of the first mobile network and stores these in the VLR of the visited main network. Data on the costs for the subscriber in the visited main network are stored in the VLR of the visited main network, and are passed on later to the HLR in the first mobile network, for example by means of a magnetic tape or via a communications link and a converter. Stored in addition in the HLR of the first mobile network is information on the whereabouts of the subscriber in the visited main network of the second mobile network. Under the prerequisite that the first mobile network has a cooperation agreement with the main network of the second mobile network and that the first mobile network is connected to the main network of the second mobile network via a communications link and a converter, a subscriber can, using an identification module which contains an IMSI that identifies the subscriber as a visitor to the main network and as a subscriber of the first mobile network, also roam in a second mobile network with which the operator of the first mobile network has no direct cooperation agreement, with which however the operator of the main network has in each case a cooperation agreement. In the method according to GB 2 280 085 A at least certain subscriber data are stored in the HLR of the main network whereas certain subscriber data are stored only in the HLR of the first mobile network so that during a visit as mentioned to a second mobile network data have to be read from the HLR of the main network and from the HLR of the first mobile network.

It is an object of this invention to propose a new signalling method and a new conversion device for telecommunications networks, which make it possible for subscribers of a home network to visit foreign networks whose operators have no roaming agreement with the operator of their home network, and which do not require any storing of subscriber data in a Home Location Register outside the home network.

In particular this object is attained through the invention in that subscribers to a telecommunications network, in which a multiplicity of subscribers communicate using telecommunications terminals, have not only a first subscriber identification, for example an International Mobile Subscriber Identity (IMSI), which was assigned to each of them from the number area of the operator of their home network and with which they each can register in their home network or in a telecommunications network whose operator has a roaming agreement with the operator of their home network, but each also have a second subscriber identification from the number area of an operator of a partner network, in that such a subscriber, with this second subscriber identification, can register in a foreign network whose operator has no roaming agreement with the operator of his home network, in that the signalling traffic concerning such a subscriber who has registered in a foreign network using his second subscriber identification is passed on to the partner network, in that the signalling traffic in the partner network is filtered, whereby the signalling traffic concerning the subscriber who has registered in said foreign network using his second subscriber identification is rerouted to his home network, and in that the signalling traffic received in the partner network from the home network concerning the subscriber who has registered in a foreign network with his second subscriber identification is rerouted to this foreign network. The telecommunications networks are, for example, mobile radio networks, for example according to GSM, UMTS or another mobile standard, or fixed networks in which subscribers can register themselves by means of identification modules. Such a method has the advantage that a subscriber from a home network, using a subscriber identification from the number area of a partner network, can register in a foreign network with whose operator the operator of his home network has no roaming agreement, the bidirectional signalling traffic between the visited foreign network and the home network being carried out according to conventional standards and being transmitted via the partner network.

During the rerouting of the signalling traffic to the home network, the second subscriber identification contained in a signalling message-protocol data unit, for example a Mobile Application Part (MAP) protocol data unit, is preferably replaced with the first subscriber identification, and during rerouting of the signalling traffic to the foreign network, the first subscriber identification contained in a signalling message-protocol data unit is replaced with the second subscriber identification. This has the advantage that in foreign networks a subscriber is recognized as an authorized subscriber from the partner network on the basis of the second subscriber identification, that in the partner network signalling traffic concerning a subscriber with a second subscriber identification is recognized as signalling traffic to be forwarded to the home network, that in the partner network signalling traffic concerning a subscriber with a first subscriber identification is recognized as signalling traffic to be forwarded to the foreign network, and that in the home network a subscriber is recognized as an authorized subscriber to the home network on the basis of the first subscriber identification.

During rerouting of the signalling traffic to the home network, the addresses, contained in signalling message-protocol data units, of network units of the foreign network, for example the number of a Home Location Register (HLR), a Visitor Location Register (VLR), a Mobile Switching Center (MSC), or a Service Center (SC)—for example a Short Message Service Center (SMSC)—are preferably replaced with addresses of corresponding network units of the partner network, and during the rerouting of the signalling traffic to the foreign network, the addresses, contained in signalling message-protocol data units, of network units of the home network are replaced with addresses of network units of the partner network. This has the advantage that in the home network signalling message protocol data units from the foreign network and in the foreign network signalling message protocol data units from the home network can thus each be considered and treated as signalling message-protocol data units from the partner network.

During rerouting of the signalling traffic to the home network, the address, contained in a signalling connection control message-protocol data unit, for example a Signalling Connection Control Part (SCCP), of a called network unit (Called Party Address) of the partner network is preferably replaced with an address of a network unit of the home network, for example the HLR of the home network, and during the rerouting of the signalling traffic to the foreign network, the address, contained in a signalling connection control message-protocol, of a calling network unit (Calling Party Address) of the home network, for example the HLR of the home network, is replaced with an address of a network unit of the partner network. This has the advantage that a signalling connection control message-protocol data unit from the foreign network, which addresses a called network unit through an address of the partner network, can thereby be re-addressed to a called network unit in the home network, and that a signalling connection control message-protocol data unit from the home network, which contains an address of the home network as the calling network unit, can be passed on to the foreign network with a calling network unit with an address from the partner network.

During the rerouting of the signalling traffic to the home network the address, contained in a signalling connection control message-protocol data unit, for example a Signalling Connection Control Part (SCCP) protocol data unit, of a calling network unit (Calling Party Address) of the foreign network is preferably replaced with an address of a network unit of the partner network, and during the rerouting of the signalling traffic to the foreign network, the address, contained in a signalling connection control message-protocol data unit, of a called network unit (Called Party Address) of the partner network is preferably replaced with an address of a network unit of the foreign network. This has the advantage that a signalling connection control message-protocol data unit from the foreign network, which contains an address of the foreign network as the calling network unit, can be passed on to the home network with a calling network unit with an address from the partner network, and that a signalling connection control message-protocol data unit from the home network, which addresses a called network unit through an address of the partner network, can be re-addressed to a called network unit in the foreign network.

During replacement of the subscriber identifications and/or of addresses of network units, the replacement value is preferably determined in each case according to predefined procedures on the basis of the value to be replaced, for example in that individual digits of a subscriber identification and/or an address of a network unit are deleted, changed or newly added. This has the advantage that it is possible for only certain parts of a subscriber identification and/or address of a network unit to be replaced in a specific way, for example certain parts, which relate to a country and/or a network. The procedures as stored, for example, in one or more procedure tables.

A procedure to be used for the replacement is determined preferably through comparison of the value to be replaced with predefined masks. This has the advantage that it is possible to examine specifically only certain parts of a subscriber identification and/or of an address of a network unit to determine whether the respective subscriber identification and/or address of a network unit is supposed to be replaced, for example certain parts relating to a country and/or a network.

In alternative or complementary embodiment variants, the first and the second subscriber identification are stored for a subscriber in different identification modules or in a common identification module. In the first variant, the respective user of a communications terminal replaces the identification module when he wishes to register in a foreign network, whereas in the second variant the desired subscriber identification is activated manually or automatically.

The objects mentioned above are also achieved in particular by means of the invention in that the conversion device for telecommunications networks, which device can be connected to the signalling system of a first telecommunications network via a first signalling connection and to a second telecommunications network via a second signalling connection, comprises:

a procedure selection table in which masks are stored and numbers of procedure tables linked to these masks;

a comparison module which compares these masks with addresses of network units contained in signalling protocol data units received via said first, respectively second, signalling connections, and, on the basis of the result of this comparison, determines a number of a procedure table;

a conversion module which applies the procedures, contained in the procedure table identified by means of the determined number, for conversion of signalling parameters contained in signalling protocol data units;

a rerouting module that passes on signalling protocol data units with converted signalling parameters via said second, respectively first, signalling connections.

The advantage of such a conversion device consists in that it makes possible the transmission, respectively rerouting, of signalling traffic between telecommunications networks whose operators have no roaming agreement with one another in that addresses (Global Title) and subscriber identifications are analyzed and modified according to predefined procedures without individual subscriber identifications and/or addresses having to be stored. It is moreover very flexible since the described procedures for the conversion device can be adapted to new applications, new network configurations, cooperation agreements or new addresses and can be extended.

The conversion device preferably comprises said procedure tables with predefined procedures according to which the replacement value in each case is determined on the basis of the value to be replaced, when replacing subscriber identifications and/or addresses of network units.

Said procedure tables preferably comprise predefined, stored masks, which are compared with the values to be replaced in order to determine a modification procedure to be used for these values to be replaced.

One embodiment of the present invention will be described in the following using an example. The embodiment example is illustrated by the following attached figures:

FIG. 1 shows an overview diagram with a block diagram and a corresponding layer diagram. The block diagram shows schematically a home network and a foreign network with connected network units which are linked together via a partner network and a conversion device, while the protocol levels of the corresponding signalling connection are illustrated schematically in the layer model.

Figure 2:
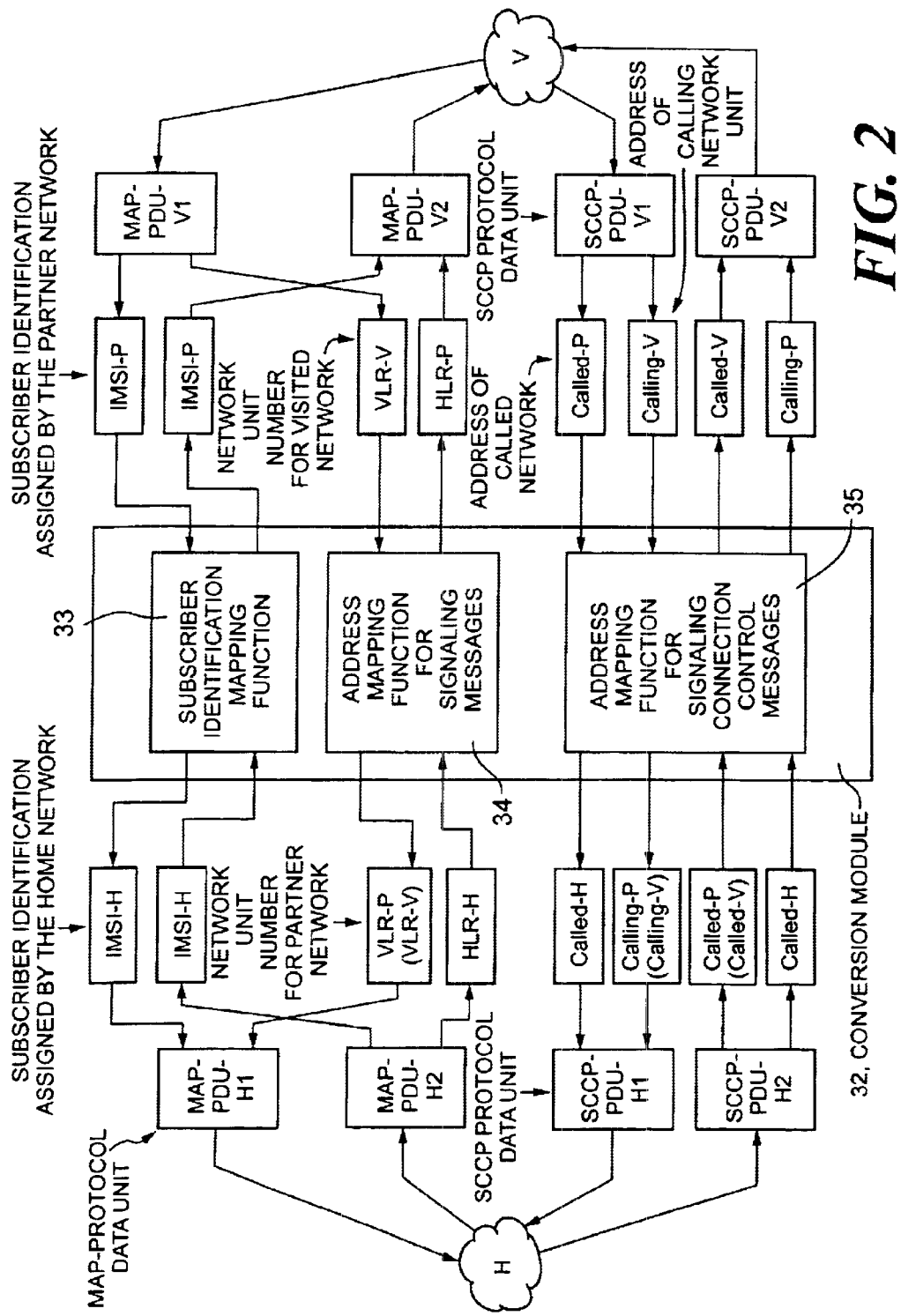

FIG. 2 shows a block diagram to which have been added schematically a conversion module of a conversion device with a subscriber identification mapping function, an address mapping function for signalling message-protocol data units, an address mapping function for signalling connection control message-protocol data units, and the corresponding input and output values to be replaced, which are taken from protocol data units received, respectively inserted in protocol data units to be passed on.

In FIG. 1, the reference numeral 1 refers to a schematically shown communications terminal, which can receive an identification module 11 with subscriber identification stored therein, which is removable, for example. The identification module 11 is, for example, a chipcard of the plug-in or full-size type, for example a card according to ISO 7816, which has a processor and a electronic memory accessible to this processor, for example a SIM (Subscriber Identification Module) card. The communications terminal 1 is, for example, a mobile radio telephone or a laptop or palmtop computer with a suitable communications module for mobile networks H, P, V, for example GSM, UMTS or other mobile networks, or a communications terminal for fixed networks, for example the Public Switched Telephone Network (PSTN), an Integrated Services Digital Network (ISDN), or another telecommunications network with fixed power supply, via which subscriber identifications can be passed on to suitable fixed network or supra-network Visitor Location Registers (VLR).

For the following description of the embodiment example, it is assumed that the user of the communications terminal 1 is a subscriber to the telecommunications network H, for example a GSM, UMTS or another mobile network, that the operator of this home network H has a roaming agreement with the operator of a partner network P, for example likewise a GSM, UMTS or other mobile network, but has no roaming agreement with the operator of a foreign network V, for example likewise a GSM, UMTS or other mobile network. In a conventional way the subscriber with the communications terminal 1 has been assigned a subscriber identification by his home operator, for example an International Mobile Subscriber Identity (IMSI-H), as described above, stored on the identification module 11. In addition, the subscriber, who is interested in visiting also foreign networks V, has been assigned a further, second subscriber identification, for example an International Mobile Subscriber Identity (IMSI-P), from the number area of the partner operator of the partner network P, and depending upon the embodiment variant, stored on its own identification module 11 or stored together with the subscriber identification IMSI-H from the home network H on an identification module 11. In the latter case, the identification module 11 can be equipped such that it comprises, for example, a software module, which makes it possible for the subscriber to activate a desired subscriber identification IMSI-H, IMSI-P, for example by means of control elements 12, or which executes an automatic activation on the basis of predefined conditions.

A subscriber so equipped can register in a visited foreign network V using an activated subscriber identification IMSI-P from the number area of the partner operator if the partner operator has a roaming agreement with the operator of the foreign network V. As defined in the GSM standard, for example, the communications terminal 1 transmits, for example upon start-up, the activated subscriber identification, for example the IMSI, stored in the identification module 11, to the Visitor Location Register (VLR) 2 of the visited network V. As with a conventional GSM location update, the VLR 2 transmits information on whereabouts to the responsible Home Location Register (HLR) of the user of the mobile device 1 concerned, the responsible HLR being determined, for example, from the subscriber identification (IMSI). Since the subscriber has registered with a subscriber identification IMSI-P from the number area of the partner network P, the information on whereabouts is transmitted to the partner network P. According to conventional standards, the IMSI is translated into a Global Mobile Title (GMT), and is used by the signalling system, for example a signalling system number 7 (SS7), on the Signalling Connection Control Part (SCCP) as the address of a called network unit, i.e. as the Called Party Address, the signalling message with the information on whereabouts being transmitted in the partner network P. Shown in FIG. 1 are the protocol levels Mobile Application Part (MAP), Transfer Capability Application Part (TCAP), Signalling Connection Control Part (SCCP) and Message Transfer Part (MTP) of the signalling system SS7, and are each associated with the blocks of the block diagram shown above by means of the curly brackets. For example, the protocol stack 2' is executed with the protocol levels MAP, TCAP, SCCP and MTP in the network unit 2, for example a VLR.

In the partner network P, the signalling traffic is filtered on the SCCP level, i.e. in block 5, which shows schematically the SCCP routing. The signalling traffic is routed on the basis of the address of the called network unit (Called Party Address), and in particular the signalling traffic is passed on via a signalling connection 7, 7' to the inventive conversion unit 3 on the basis of the Global Mobile Title described above. The schematically shown block 5 is located, for example, at a Signalling Transfer Point 8' (STP). It should be noted, however, that a plurality of such STP 8' could very well transmit the signalling traffic, as described, via a signalling connection 7,7' to the inventive conversion device 3, said plurality of STP 8' being connected to the conversion device 3 via a multiplexing network, for example.

As is indicated schematically 1 by block 3' in FIG. 1, the conversion device 3, for example a conventional communications server, has two protocol stacks with the protocol levels MAP, TCAP, SCCP and MTP, of which the one protocol stack is connected to the partner network P, via the signalling connection 7, 7' mentioned above, and the other protocol stack is connected to the home network H, respectively to a network unit 4 connected thereto, for example an HLR, via the signalling connection 6, 6'.

Also shown in block 3' is a rerouting module 30 of the conversion device 3, which is designed, for example, as a software module. The rerouting module 30 has access to the interfaces of the protocol stacks mentioned above in the conversion device 3, and can receive protocol data units with data and parameters from the protocol stack, can convert them, as will be described more closely later, and can give to the other protocol stack for forwarding. The rerouting module 30 comprises a comparison module 31, for example a software module, which has access to a procedure selection table 36 with predefined, stored masks (Global Title Mask), and which compares these masks with certain parameters received from the protocol stacks. Depending upon the outcome of this comparison, different predefined procedures stored in procedure tables 37 are applied for converting certain parameters in a conversion module 32, as will now be more closely described.

In the comparison module 31, first the numbering plan is determined, for example No. 1 for E.164 or No. 7 for E.214, of a received Called Party Address of the SCCP level, and then in the procedure selection table 36 a comparison is made with the stored, predefined masks (Global Title Analysis) corresponding to the particular numbering plan, the length of which masks can differ. Depending upon the agreement with one of the masks, a number of a procedure table 37 is chosen from the procedure selection table 36, and the set of predefined procedures contained therein is applied for conversion of certain received parameters. Should there be no agreement between the Called Party Address of the SCCP level and the predefined masks in the procedure selection table 36, the process is repeated for the Calling Party Address of the SCCP level, and if there is agreement, a procedure table 37 with a set of predefined procedures, and otherwise a procedure table 37 with a default set of predefined procedures, is chosen for the conversion. The table below represents an example of a procedure selection table 36 with numbering plan, masks and numbers associated with a procedure table 37:

| Numbering Plan | Mask(Global Title Mask) | Procedure Table No. |
|---|---|---|
| 1 (E.164) | 4179 | No. 1 |
| 1 (E.164) | 3300134 | No. 3 |
| 7 (E.214) | 331234567 | No. 2 |

According to the example described above, in which the signalling traffic has been conducted via a signalling connection 7, 7' to the inventive conversion device 3, the Called Party Address of the SCCP level, as described above, corresponds to the Mobile Global Title derived from the subscriber identification (IMSI). The Mobile Global Title corresponds to the format of the numbering plan 7 (E.214) so that, according to the above procedure selection table 36, procedure table No. 2 is applied for the conversion if the Mobile Global Title of the predefined mask corresponds to "331234567."

The predefined procedures contained in the procedure table 37 specify which modifications (for which numbering plans and) for which predefined masks are to be carried out for the parameters of the SCCP level (SCCP parameters) and for parameters of the MAP level (MAP parameters), as is illustrated, by way of example, in the table below:

| Procedure Table No. 2 | | |
|---|---|---|
| SCCP | | |
| Numbering Plan | Mask(Global Title Mask) | Modification Procedure |
| 1 (E.164) | 417938 | 6-3388 |
| 1 (E.164) | 417939 | 6-33899 |
| 7 (E.214) | 331234567 | 9-445566778 |
| MAP | | |
| IMSI: | | |
| Mask | | Modification Procedure |
| 228011122 | | 9-334455667 |
| MSC-Number, VLR-Number, HLR-Number, SC-Number: | | |
| Mask | | Modification Procedure |
| 417938 | | 6-3388 |
| 417939 | | 6-33899 |

The modification procedures in the example procedure table 37 above are to be understood as follows: the first number (before the hyphen) indicates how many digits of the subscriber identification (IMSI) to be replaced or address are to be cancelled, and the following numbers (after the hyphen) are the new replacement digits. If the number of cancelled digits and the number of new replacement digits are not the same, a new address length is calculated. Should no agreement be found with any of the masks of the respective set of procedures 37, no changes are made.

Given below is an example for modifying, respectively replacing, a received SCCP address with a new SCCP address:

| | | | |
|---|---|---|---|
| Received address: | | | 41793899000 |
| Numbering plan: | 7 (E.214) | Masks: | 417938 |
| Modification procedure: | | | 6-3380140 |
| New address: | | | 338014099000 |

Given below is an example for modifying, respectively replacing, a received IMSI with a new IMSI:

| | |
|---|---|
| Received IMSI: | 228011234000012 |
| Mask: | 22801123400 |
| Modification procedure: | 11-33801338999 |
| New IMSI: | 338013389990012 |

FIG. 2 is a block diagram representing schematically the conversion module 32 of the conversion device 3. The conversion module 32 carries out the conversion of MAP and SCCP parameters according to the determined procedures described above. In FIG. 2 the arrows indicate the direction of flow of the signalling traffic, whereby the symbolically shown telecommunications networks V, H illustrate whether the MAP protocol data units concerned MAP-PDU (Protocol Data Unit, PDU), respectively SCCP protocol data units SCCP-PDU, are received from the visited foreign network V or from the home network H, or are respectively passed on to the visited foreign network V or to the home network H.

As shown in FIG. 2, in the direction from the foreign network V to the home network H, the subscriber identification IMSI-P described above from the number area of the partner operator and the network unit number, in our example the Visitor Location Register VLR-V of the foreign network V, are supplied from the MAP-protocol data unit MAP-PDU-V1 to the conversion module 32. According to the established procedures above, in the subscriber identification mapping function 33, the subscriber identification IMSI-P is replaced with the subscriber identification IMSI-H from the number area of the home network H. The network unit number VLR-V, according to the above established procedures, is replaced in the address mapping function 34 for signalling messages with the number of the network unit VLR-P from the number area of the partner network P, or it can be transmitted transparently. The new subscriber identification IMSI-H and the new network unit number VLR-P are inserted in the MAP-protocol data unit MAP-PDU-H1. In the same direction, the addresses of the called network unit (SCCP Called Party Address) Called-P and the address of the calling network unit (SCCP Calling Party Address) Calling-V are supplied from the SCCP-protocol data unit SCCP-PDU-V1 to the conversion module 32. According to the above established procedures, in the address mapping function 35 for signalling connection control messages, the SCCP Called Party Address Called-P is replaced with the SCCP Called Party Address Called-H from the number area of the home network H. The SCCP Calling Party Address Calling-V, according to the above established procedures, in the address mapping function 35 for signalling connection control messages, is replaced with the SCCP Calling Party Address Calling-P from the number area of the partner network P, or it can be passed on transparently. The new SCCP Called Party Address Called-H and the new SCCP Calling Party Address Calling-P are inserted in the SCCP protocol data unit SCCP-PDU-H1. The MAP-protocol data unit MAP-PDU-H1 and the SCCP protocol data unit SCCP-PDU-H1 are conducted via the signalling connection 6, 6' (see FIG. 1) to the network unit 4, for example a Home Location Register (HLR), of the home network H, where they are received through the standard protocol stack 4' and are further processed in a conventional way.

The signalling connection 6, 6', shown symbolically in FIG. 1, is a leased circuit, for example, which is connected to the conversion device 3, for example via a multiplexing network. If the logical network unit 4, in our example the Home Location Register 4, is executed on various physical nodes of the home network H, a routing function is moreover achieved on the SCCP level. If, in an alternative embodiment variant, the signalling connection 6, 6' is processed via an IP (Internet Protocol) network, security means are additionally employed, for example according to the TTP (Trusted Third Party), PTP (Point to Point) or another method. It is also possible to achieve the routing function on the MTP level.

As shown in FIG. 2, in the opposite direction from the home network H to the foreign network V, for example in connection with a standard question regarding a roaming number, the subscriber identification IMSI-H described above from the number area of the home operator and the number of a network unit, in our example the Home Location Register HLR-H of the home network H is supplied to the conversion module 32 from the MAP protocol data unit MAP-PDU-H2. In the subscriber identification mapping function 33, according to new procedures which are determined as described above, the subscriber identification IMSI-H is replaced with the subscriber identification IMSI-P from the number area of the partner network P. The network unit number HLR-H is replaced with the network unit number HLR-P from the number area of the partner network P, according to the new established procedures, in the address mapping function 34 for signalling messages. The new subscriber identification IMSI-P and the new network unit number HLR-P are inserted in the MAP-protocol data unit MAP-PDU-V2. In the same direction, the address of the called network unit (SCCP Called Party Address) Called P and the address of the calling network unit (SCCP Calling Party Address) Calling-H are supplied to the conversion module 32 from the SCCP-protocol data unit SCCP-PDU-H2. The SCCP Called Party Address Called-P is replaced with the SCCP Called Party Address Called-V from the number area of the foreign network V, according to the new established procedures, in the address mapping function 35 for signalling connection control messages; if the SCCP Calling Party Address Calling-V has been received previously transparently, the SCCP Called Party Address Called-V can be passed on transparently. The SCCP Calling Party Address Calling-H according to the new established procedures, in the address mapping function 35 for signalling connection control messages, is replaced with the SCCP Calling Party Address Calling-P from the number area of the partner network P. The new SCCP Called Party Address Called-V and the new SCCP Calling Party Address Calling-P are inserted in the SCCP-protocol data unit SCCP-PDU-V2. The MAP-protocol data unit MAP-PDU-V2 and the SCCP-protocol data unit SCCP-PDU-V2 are conducted via the signalling connection 7, 7' (see FIG. 1) to the network unit 2, for example a Visitor Location Register (VLR), of the foreign network V, where they are received through the standard protocol stack 2', and are further processed in a conventional way.

The signalling method according to the invention and the conversion device 3 according to the invention thus make possible, as described above, the further transmission, respectively rerouting, of the signalling traffic between telecommunications networks whose operators have not concluded any roaming agreements with each other in that addresses (Global Title) and subscriber identifications are analyzed and modified according to predefined procedures without individual subscriber identifications and/or addresses thereby having to be stored. Subscribers to the home network, who, as described, visit a foreign network, thus can also be reached in this foreign network, for example under the same call number, e.g. the MSISDN number (Mobile Subscriber ISDN number), which is linked to their subscriber identification and is stored in the HLR of their home network, and they can make calls as if they were subscribers to the partner network P. The solution described is moreover very flexible since the described procedures of the conversion device 3 can be adapted, respectively extended, to new applications, new network configurations, cooperation agreements or new addresses, for example by means of corresponding administration tools (software applications) via suitable network connections or via a terminal directly connected to the conversion device 3, or through local or remote loading of new files with adapted procedures.

Besides the operation and/or installation of conversion devices 3, as described in the present invention, particularly interesting can also be the sale or leasing of conversion devices 3 according to the invention to operators of telecommunications networks, or the extension of conventional network units in such a way that they can be used as the described conversion devices 3. It may also be interesting to sell data carriers or to give them for a limited time to interested customers with licensing fees, the data carriers containing software programs to control communications servers that then operate as the described conversion devices 3.

What is claimed is:

1. A signaling method for telecommunications networks in which a multiplicity of subscribers communicate using telecommunications terminals, at least one of the subscribers using a first subscriber identification assigned to the subscriber from the number area of an operator of a home network to register in the home network or in a telecommunications network whose operator has a roaming agreement with the operator of the home network, comprising:

assigning a second subscriber identification to the subscriber from the number area of an operator of a partner network;

the subscriber registering in a visited network with the second subscriber identification, the operator of the home network having no roaming agreement with the operator of the visited network;

passing the signaling traffic concerning the subscriber registered with the second subscriber identification in the visited network to the partner network;

filtering the signaling traffic concerning the subscriber registered in the visited network with the second subscriber identification and conducted to the partner network;

rerouting the filtered signaling traffic to the home network including replacing, for the rerouting of the signaling traffic to the home network, the second subscriber identification contained in a signaling message protocol data unit by the first subscriber identification; and rerouting the partner network signaling traffic to the visited network, including replacing, for the rerouting of the signaling traffic to the visited network, the first subscriber identification contained in a signaling message protocol data unit of the partner network signaling traffic received from the home network concerning the subscriber registered in the visited network with the second subscriber identification.

2. The signaling method according to claim 1, wherein, during the rerouting of the signaling traffic to the home network, addresses of network units of the visited network contained in signaling message protocol data units are replaced by addresses of network units of the partner network or forwarded transparently, and, during the rerouting of the signaling traffic to the visited network, addresses of network units of the home network contained in signaling message protocol data units are replaced by addresses of network units of the partner network.

3. The signaling method according to claim 1, wherein, during the rerouting of the signaling traffic to the home network, an address of a called network unit of the partner network contained in a signaling connection control message protocol data unit is replaced by an address of a network unit of the home network, and, during the rerouting of the signaling traffic to the visited network, an address of a calling network unit of the home network contained in a signaling connection control message protocol data unit is replaced by an address of a network unit of the partner network.

4. The signaling method according to claim 3, wherein the signaling connection control message protocol data units are SCCP protocol data units.

5. The signaling method according to claim 1, wherein, during the rerouting of the signaling traffic to the home network, an address of a calling network unit of the visited network contained in a signaling connection control message protocol data unit is replaced by an address of a network unit of the partner network or forwarded transparently, and, during the rerouting of the signaling traffic to the visited network, an address of a called network unit of the partner network contained in a signaling connection control message protocol data unit is replaced by an address of a network unit of the visited network.

6. The signaling method according to claim 1, wherein, during the replacement of the subscriber identifications, a replacement value is determined from a corresponding value to be replaced according to at least one predefined procedure.

7. The signaling method according to claim 6, wherein the at least one predefined procedure to be used for replacing a value is determined through comparison of the value to be replaced with at least one predefined mask.

8. The signaling method according to claim 1, wherein the signaling message protocol data units are MAP protocol data units.

9. The signaling method according to claim 1, wherein the first and the second subscriber identifications for a subscriber are stored in different identification modules.

10. The signaling method according to claim 1, wherein the first and the second subscriber identifications for a subscriber are stored in a common identification module.

11. A conversion device for telecommunications networks, which can be connected to a signaling system of a first telecommunications network via a first signaling connection and to a signaling system of a second telecommunications system via a second signaling connection, comprising:

a procedure selection table which stores masks and numbers of procedure tables associated with the masks, a comparison module which compares the masks with addresses of network units contained in signaling protocol data units received via the first and the second signaling connections and selects one of the numbers corresponding to a procedure table based on the result, of the comparison, a conversion module which applies a conversion procedure described by the procedure table identified through the selected number to convert signaling parameters contained in the signaling protocol data units, and a rerouting module which forwards signaling protocol data units with converted signaling parameters via the second and the first signaling connection, and a subscriber identification mapping function, which replaces, when forwarding signaling protocol data units from the first telecommunications network via the second signaling connection to the second telecommunications network, a first subscriber identification from the number area of the first telecommunications network contained in signaling message-protocol data units from the first telecommunications network with a second subscriber identification from the number area of the second telecommunications network, and replaces, when forwarding signaling protocol data units from the second telecommunications network via the first signaling connection to the first telecommunications network, a second subscriber identification from the number area of the second telecommunications network contained in signaling message-protocol data units from the second telecommunications network with a first subscriber identification from the number area of the first telecommunications network.

12. The conversion device according to claim 11, further comprising an address mapping function for signaling messages, which replaces addresses of network units of a visited network, contained in signaling message protocol data units, or forwards the addresses transparently, and replaces addresses of network units of the first telecommunications network, contained in signaling message protocol data units, with addresses of network units of the second telecommunications network.

13. The conversion device according to claim 11, further comprising an address mapping function for signaling connection control messages, which replaces an address of a called network unit of the second telecommunications network, contained in a signaling connection control message protocol data unit, with an address of a network unit of the first telecommunications network, and replaces the address of a calling network unit of the first telecommunications network, contained in a signaling connection control message protocol data unit, with an address of a network unit of the second telecommunications network.

14. Conversion device according to claim 13, wherein the signaling connection control message protocol data units are SCCP protocol data units.

15. The conversion device according to claim 11, further comprising an address mapping function for signaling connection control messages, which replaces the address of a calling network unit of a visited network, contained in a signaling connection control message protocol data unit, with an address of a network unit of the second telecommunications network or forwards the address contained in the signaling connection control message protocol data unit transparently, and replaces the address of a called network unit of the second telecommunications network, contained in a signaling connection control message protocol data unit, with an address of a network unit of the visited network.

16. The conversion device according to claim 11, wherein the procedure tables comprise predefined procedures, according to which each replacement value is selected based on the value to be replaced during replacement of subscriber identifications and addresses of network units.

17. The conversion device according to claim 16, wherein the procedure tables comprise predefined masks, which are used to compare with values to be replaced in order to select a modification procedure to be used in replacing the values.

18. The conversion device according to claim 12, wherein the signaling message protocol data units are MAP protocol data units.

* * * * *